(12) United States Patent
Yamane

(10) Patent No.: US 8,588,538 B2
(45) Date of Patent: Nov. 19, 2013

(54) IMAGE PROCESSING APPARATUS AND METHOD

(75) Inventor: Masahito Yamane, Kanagawa (JP)

(73) Assignee: Sony Corporation, Tokyo (JP)

( * ) Notice: Subject to any disclaimer, the term of this patent is extended or adjusted under 35 U.S.C. 154(b) by 236 days.

(21) Appl. No.: 13/178,601

(22) Filed: Jul. 8, 2011

(65) Prior Publication Data

US 2012/0014587 A1 Jan. 19, 2012

(30) Foreign Application Priority Data

Jul. 15, 2010 (JP) .................................. 2010-160559

(51) Int. Cl.
*G06K 9/36* (2006.01)

(52) U.S. Cl.
USPC ........................................................ 382/233

(58) Field of Classification Search
USPC ......... 382/232–233, 236, 238–240, 244–250, 382/252; 348/387.1, 390.1, 394.1–395.1, 348/400.1–404.1, 408.1–415.1, 348/420.1–421.1, 424.2, 425.2; 375/240.2–240.3, 240.12–240.14, 375/240.18–240.21, 240.24, 240.27
See application file for complete search history.

(56) References Cited

U.S. PATENT DOCUMENTS 6,970,505 B2 * 11/2005 Sugahara .................. 375/240.01
7,907,785 B2 * 3/2011 Fukuhara et al. ............. 382/240
8,411,741 B2 * 4/2013 Sugiyama et al. ........ 375/240.03

FOREIGN PATENT DOCUMENTS

| JP | 3856292 | 9/2006 |
| JP | 3948024 | 4/2007 |
| JP | 3948025 | 4/2007 |

* cited by examiner

*Primary Examiner* — Jose Couso
(74) *Attorney, Agent, or Firm* — Wolf, Greenfield & Sacks, P.C.

(57) ABSTRACT

An image processing apparatus includes the following elements. A specifying unit specifies a blank region of an image of image data by using coefficient data which is decoded from encoded data, the encoded data being obtained by encoding coefficient data generated from the image data. A dividing unit divides the decoded coefficient data into first components and second components. An eliminating unit eliminates the blank region specified by the specifying unit from the first components divided from the decoded coefficient data by the dividing unit. A synthesizing unit combines the first components from which the blank region has been eliminated by the eliminating unit with the second components divided from the decoded coefficient data by the dividing unit.

10 Claims, 8 Drawing Sheets

```
        151
10001111
00001111
00001111
00000001
00000001
00000001
11000001
11000111
```

IMAGE PROCESSING APPARATUS AND METHOD

CROSS REFERENCE TO RELATED APPLICATIONS

This application claims priority under 35 U.S.C. §119 to Japanese Priority Patent Application JP 2010-160559, filed in the Japan Patent Office on Jul. 15, 2010, the entire contents of which are hereby incorporated by reference.

BACKGROUND

The present disclosure relates to image processing apparatuses and methods, and more particularly, to an image processing apparatus and method that can reduce the amount of encoded image data more easily.

Pathological diagnosis using a digital pathology imaging (DPI) system has been applied to biopsies (tissue diagnosis) and is now finding wide application in cytological diagnosis as well as biopsies.

A biopsy is a medical test for an examination or operation conducted as follows. A diseased sample is collected by being cut out with a knife and is sliced into thin portions. The sliced portions are then stained and are examined under a microscope. Generally, in a biopsy, cells are examined as a cell group, and are checked for abnormalities in terms of the size, shape, and arrangement of the cells in the cell group. Examinations are also made for the presence of abnormal cells in the cell group.

In contrast, cytological diagnosis is a medical test conducted as follows. Naturally exfoliated cells (sputum cytology), intentionally exfoliated cells (exfoliative cytology), or cells aspirated through a needle (aspiration cytology) are stained, and are examined under a microscope. Generally, in cytological diagnosis, a small number of cells are examined, and are checked for abnormalities in terms of the size, shape, etc., of each cell or the nucleus thereof.

In the DPI system, images of such tissues or cells (images obtained by imaging the tissues or cells under a microscope) are handled as digital data. Accordingly, various types of image processing may be performed on such images (digital data) in accordance with the purpose of use.

Generally, such digital data is encoded by using an encoding method, such as Joint Photographic Experts Group (JPEG), and the amount of data is reduced.

The amount of JPEG encoded data may be further reduced by performing conversion processing (transcoding) on the encoded data. Japanese Patent Nos. 3856292, 3948024, and 3948025 disclose methods for further reducing the amount of encoded data using transcoding.

In the methods disclosed in the above patents, the amount of data is reduced by transforming Discrete Cosine Transform (DCT) coefficients. Such data reduction using transcoding can be used for all JPEG encoded data.

In the methods disclosed in the above patents, however, consideration is not given to the characteristics of images (digital data) obtained by imaging tissues or cells in cytological diagnosis, which may make it difficult to sufficiently reduce the amount of data.

In the DPI system, specimens are placed on a transparent plate and are imaged with a microscope. Because of this reason, generally, cytopathic digital images or histopathlogic digital images handled in the DPI system include many blank portions (regions) without the presence of cells. Particularly, digital images captured in cytological diagnosis include many blank portions without the presence of cells because the number of cells examined is small. Such blank portions are not used for examination, but the image data of the cells is compressed with noise included in such blank portions. That is, the blank portions also count toward the amount of data, and the amount of data is increased because of such unnecessary blank portions.

It is thus expected that the amount of data will further be reduced by performing transcoding by taking such characteristics into consideration. In the related art, however, no methods for performing such transcoding have been proposed, and it is difficult to reduce the amount of data sufficiently.

It is thus desirable to reduce the amount of encoded image data more easily.

SUMMARY

An image processing apparatus according to an embodiment of the present disclosure includes: a specifying unit configured to specify a blank region of an image of image data by using coefficient data which is decoded from encoded data, the encoded data being obtained by encoding coefficient data generated from the image data; a dividing unit configured to divide the decoded coefficient data into first components and second components; an eliminating unit configured to eliminate the blank region specified by the specifying unit from the first components divided from the decoded coefficient data by the dividing unit; and a synthesizing unit configured to combine the first components from which the blank region has been eliminated by the eliminating unit with the second components divided from the decoded coefficient data by the dividing unit.

The specifying unit may include a generator configured to generate a decoded image from the coefficient data, and may specify a blank region of the decoded image generated by the generator.

The specifying unit may further include an obtaining unit configured to supply the decoded image generated by the generator to a different apparatus that generates a region-of-interest (ROI) mask which includes information indicating a blank region of the decoded image, and configured to obtain the ROI mask generated by the different apparatus. The eliminating unit may eliminate the blank region indicated in the ROI mask obtained by the obtaining unit from the first components which are divided from the coefficient data by the dividing unit.

The specifying unit may further include an extracting unit configured to extract partial components from the coefficient data. The generator may generate a decoded image from the partial components extracted by the extracting unit. The obtaining unit may supply the decoded image generated from the partial components by the generator to the different apparatus, and may obtain a ROI mask indicating a blank region of the decoded image generated by the generator. The eliminating unit may eliminate the blank region indicated in the ROI mask obtained by the obtaining unit from the first components which are divided from the coefficient data by the dividing unit.

The specifying unit may further include a detector configured to detect the blank region from the decoded image generated by the generator. The eliminating unit may eliminate the blank region detected by the detector from the first components divided from the coefficient data by the dividing unit.

The encoded data may be obtained by performing Huffman encoding on the coefficient data.

The image data may be an image obtained by imaging cells or tissues of an organism.

The first components may be alternating current (AC) components, and the second components may be direct current (DC) components.

The synthesizing unit may substitute the first component corresponding to the blank region eliminated by the eliminating unit with an end of block, and may combine the first components with the second components.

An image processing method for use in an image processing apparatus according to an embodiment of the present disclosure includes: specifying a blank region of an image of image data by using coefficient data which is decoded from encoded data, the encoded data being obtained by encoding coefficient data generated from the image data; dividing the decoded coefficient data into first components and second components; eliminating the specified blank region from the first components; and combining the first components from which the blank region has been eliminated with the second components.

According to an embodiment of the present disclosure, by using coefficient data which is decoded from encoded data, the encoded data being obtained by encoding coefficient data generated from image data, a blank region, which is not an ROI, of an image of the image data is specified. The coefficient data is divided into AC components and DC components. The specified blank region is eliminated from the AC components which are separated from the DC components. The AC components from which the blank region has been eliminated are combined with the DC components.

According to an embodiment of the present disclosure, images can be processed, and in particular, the amount of encoded image data can be reduced more easily.

DETAILED DESCRIPTION OF EMBODIMENTS

Figure 1:
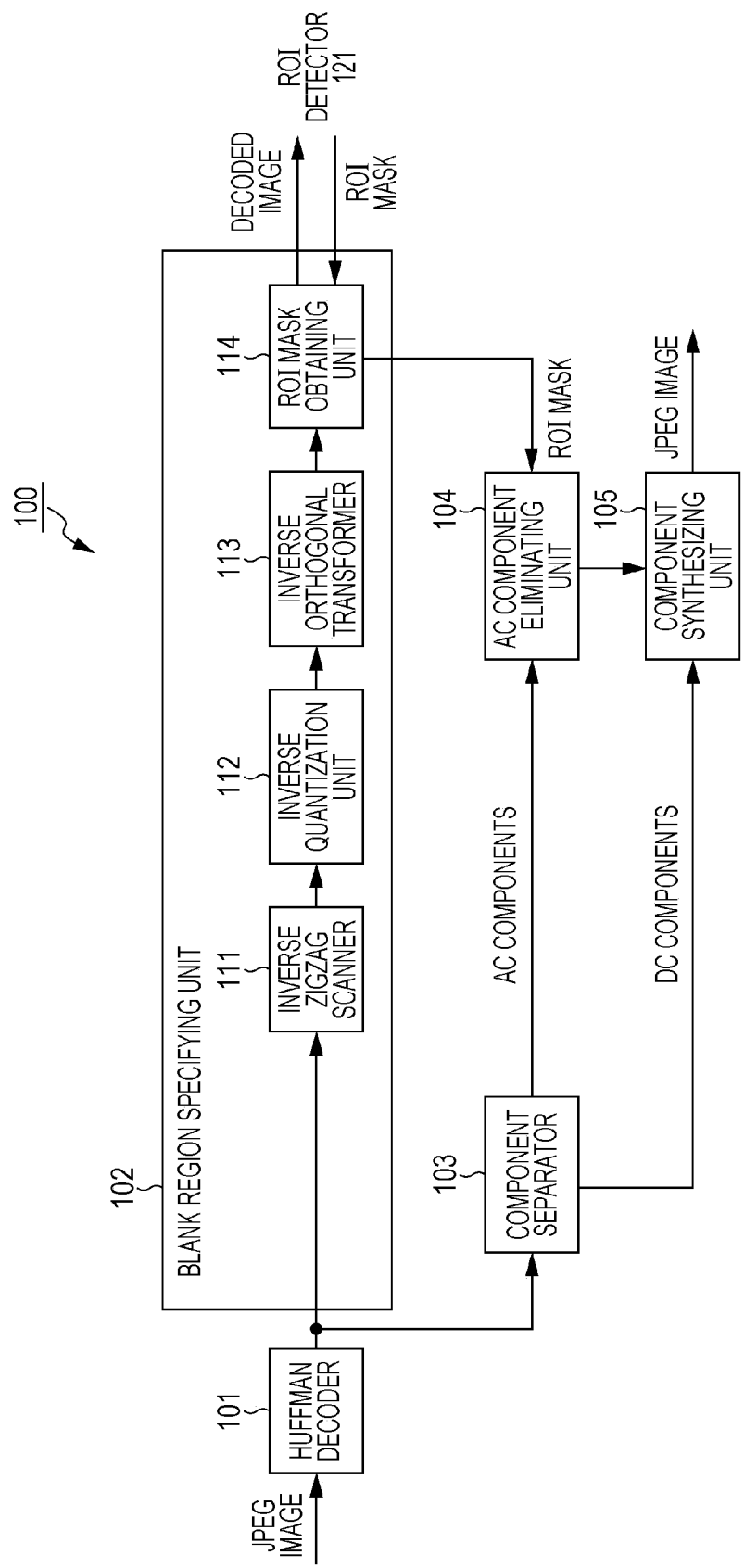
FIG. 1 is a block diagram illustrating an example of the major parts of the configuration of a transcoder according to a first embodiment of the present disclosure.

Embodiments of the present disclosure are described below in the following order:
1. First Embodiment (Transcoder);
2. Second Embodiment (Transcoder);
3. Third Embodiment (Transcoder); and
4. Fourth Embodiment (Personal Computer).
1. First Embodiment Transcoder FIG. 1 is a block diagram illustrating an example of the major parts of the configuration of a transcoder 100 according to a first embodiment of the present disclosure. The transcoder 100 is configured to perform conversion processing (transcoding) for recompressing JPEG images, which are encoded data compressed by using a JPEG encoding method.

That is, the transcoder 100 recompresses input JPEG images and outputs the JPEG images with a reduced amount of data.

The transcoder 100 performs transcoding by using a method suitable for, for example, cytopathic digital images or histopathlogic digital images handled in the DPI system, i.e., a method suitable for the characteristics of images (digital data) obtained by imaging tissues or cells in a biopsy or cytological diagnosis. More specifically, as discussed above, in images obtained through examinations of a biopsy or cytological diagnosis (particularly, in images obtained in cytological diagnosis), many blank regions (portions) without the presence of cells, which are unnecessary for examinations in diagnosis, are included. The transcoder 100 eliminates alternating current (AC) components of such blank regions and maintains only direct current (DC) components, thereby making it possible to significantly reduce the amount of data.

The transcoder 100 includes, as shown in FIG. 1, a Huffman decoder 101, a blank region specifying unit 102, a component separator 103, an AC-component eliminating unit 104, and a component synthesizing unit 105.

The Huffman decoder 101 decodes a JPEG image which has been encoded using Huffman encoding according to the JPEG standards, and supplies the decoded coefficient data to the blank region specifying unit 102. The Huffman decoder 101 also supplies the JPEG image and Huffman decoding results to the component separator 103.

The blank region specifying unit 102 specifies blank regions, which are contained in the decoded image and which are not regions of interest (ROIs), from the supplied coefficient data. For example, in the case of images obtained through examinations of a biopsy or cytological diagnosis, regions without the presence of cells are blank regions.

The blank region specifying unit 102 generates a decoded image from the supplied coefficient data and provides the decoded image to a region-of-interest (ROI) detector 121, which is disposed outside the transcoder 100. The external ROI detector 121 detects ROIs so as to generate an ROI mask specifying the ROIs. The external ROI detector 121 supplies the ROI mask to the blank region specifying unit 102. Blank regions are not ROIs, and the ROI mask specifies ROIs and also specifies blank regions.

The blank region specifying unit 102 includes, as shown in FIG. 1, an inverse zigzag scanner 111, an inverse quantization unit 112, an inverse orthogonal transformer 113, and an ROI mask obtaining unit 114.

The inverse zigzag scanner 111 performs inverse zigzag scanning on linear coefficient data which has been subjected to Huffman decoding so as to convert the linear coefficient data to a two-dimensional coefficient data. The inverse zigzag scanner 111 then supplies the converted two-dimensional coefficient data to the inverse quantization unit 112.

The inverse quantization unit 112 inverse-quantizes the two-dimensional coefficient data and supplies the inverse-quantized two-dimensional coefficient data to the inverse orthogonal transformer 113.

The inverse orthogonal transformer 113 performs inverse orthogonal transform on the coefficient data so as to generate a decoded image. The decoded image is supplied to the ROI mask obtaining unit 114.

The ROI mask obtaining unit 114 supplies the decoded image to the external ROI detector 121. The ROI detector 121 generates an ROI mask that specifies ROIs (and blank regions) of the decoded image.

Figures 2A, 2B:
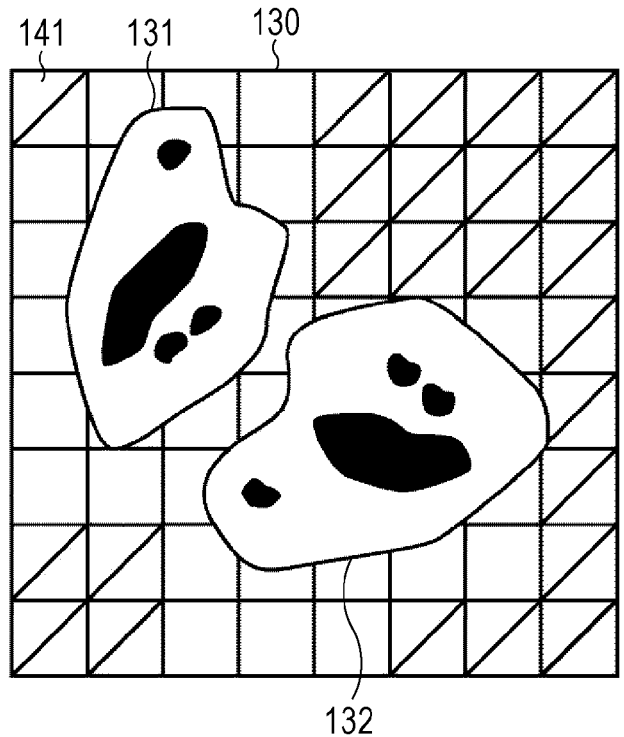
FIGS. 2A and 2B illustrate data conversion and a region-of-interest (ROI) mask, respectively.

It is now assumed that the decoded image is an image 130 shown in FIG. 2A. The image 130 includes cells 131 and 132. The squares shown in the image 130 are blocks, which serve as processing units for detecting ROIs. As shown in FIG. 2A, the blocks with oblique lines do not contain the cell 131 or 132. That is, such blocks are blank regions 141.

The ROI detector 121 generates, for example, a binary ROI mask 151 shown in FIG. 2B. In the ROI mask 151 shown in FIG. 2B, each value indicates whether the corresponding block is an ROI or a blank region.

In the ROI mask 151 shown in FIG. 2B, 0 represents an ROI, while 1 represents a blank region. That is, 1 indicates that AC components are to be eliminated from the corresponding regions, while 0 indicates that AC components are not to be eliminated from the corresponding regions.

The ROI mask 151 may be generated by using any desired method. Additionally, the ROI mask 151 may include information other than the above-described information. For example, the ROI mask 151 may be three-valued data or greater.

If the decoded image has a size of X pixels by Y pixels, it is expressed by INT((X+7)/8*INT((Y+7)/8) bits. Concerning color difference components, when it is necessary to eliminate AC components from all the corresponding luminance components, AC components are also eliminated from the color difference components.

Upon receiving an ROI mask generated by the ROI detector 121, the ROI mask obtaining unit 114 supplies the ROI mask to the AC component eliminating unit 104.

The component separator 103 divides the JPEG image supplied from the Huffman decoder 101 into AC component codes and DC component codes on the basis of the Huffman decoding results. The component separator 103 supplies the separated AC component codes and DC component codes to the AC component eliminating unit 104 and the component synthesizing unit 105, respectively.

The AC component eliminating unit 104 eliminates AC components of the blank regions from the AC component codes supplied from the component separator 103 in the following manner. The AC component eliminating unit 104 substitutes data of the regions, which are specified as the blank regions (blocks) of the ROI mask supplied from the ROI mask obtaining unit 114, with an end of block (EOB). The EOB indicates that the AC components in the block are 0. In this manner, the AC component eliminating unit 104 eliminates AC components of the blank regions from the AC component codes.

The AC component eliminating unit 104 supplies the AC component codes from which AC components of the blank regions are eliminated (blank regions are substituted with FOB) to the component synthesizing unit 105.

The component synthesizing unit 105 combines the DC component codes supplied from the component separator 103 with the AC component codes without blank regions supplied from the AC component eliminating unit 104 so as to generate a JPEG image subjected to transcoding processing. This JPEG image is the image from which AC components of the blank regions of the JPEG image, which has been input into the transcoder 100 before subjected to transcoding processing, are eliminated. The component synthesizing unit 105 outputs the JPEG image subjected to transcoding processing.

Flow of Conversion Processing

An example of the flow of conversion processing performed by the transcoder 100 is described below with reference to the flowchart of FIG. 3. Upon input of a JPEG image (JPEG data), the transcoder 100 starts conversion processing.

Upon start of the conversion processing, in step S101, the Huffman decoder 101 performs Huffman decoding on the input JPEG data (Huffman codes).

In step S102, the inverse zigzag scanner 111 performs inverse zigzag scanning on coefficient data which has been subjected to Huffman decoding so as to convert the linear coefficient data into two-dimensional coefficient data. In step S103, the inverse quantization unit 112 performs inverse quantization on the two-dimensional coefficient data. In step S104, the inverse orthogonal transformer 113 performs inverse orthogonal transform on the inverse-quantized coefficient data so as to generate a decoded image.

In step S105, the ROI mask obtaining unit 114 sends the decoded image to the ROI detector 121 and obtains an ROI mask from the ROI detector 121.

In step S106, the component separator 103 divides the JPEG data into AC component codes and DC component codes on the basis of the Huffman decoding results obtained in step S101. In step S107, in the AC component codes separated from the DC component codes in step S106, the AC component eliminating unit 104 substitutes the regions (blocks), which are specified as the blank regions in the ROI mask supplied from the ROI mask obtaining unit 114, with the EOB, thereby eliminating the AC components of the blank regions.

In step S108, the component synthesizing unit 105 combines the AC component codes from which AC components of the blank regions have been eliminated with the DC component codes so as to generate converted JPEG data.

In step S109, the component synthesizing unit 105 outputs the converted JPEG data, and the conversion processing is completed.

As described above, the transcoder 100 eliminates AC components of blank regions from a JPEG image. That is, the transcoder 100 is able to more greatly reduce the amount of data only for unnecessary blank regions without reducing the image quality of ROIs which are important for the purpose of use (for example, a biopsy or cytological diagnosis) of the image.

In the case of images obtained by imaging cells or tissues under a microscope and used in a biopsy or cytological diagnosis, generally, such images include portions with cells or tissues to be examined and portions without cells or tissues. It is necessary that the portions with cells or tissues, which are important portions used for examinations, be of high quality. Basically, however, the portions without cells or tissues are portions (blank regions) unnecessary for examinations.

For processing such images, as described above, the transcoder 100 reduces the amount of data of portions without cells or tissues without deteriorating the image quality of portions with cells or tissues used for examinations.

Thus, the transcoder 100 is able to more greatly reduce the amount of data while maintaining the overall image quality. That is, the transcoder 100 can maintain the value of the image, which would otherwise be impaired by reducing the amount of data.

With the use of the transcoder 100, transcoding of JPEG images can be performed by simply eliminating AC components without the need of complicated computation. Thus, transcoding can be performed speedily with a decreased load, which also leads to a cost reduction.

That is, the transcoder 100 can more greatly reduce the amount of data more easily.

2. Second Embodiment

Transcoder

In the first embodiment, the blank region specifying unit 102 provides a decoded image to the ROI detector 121. However, instead of the entire decoded image, only part of image information, such as a luminance signal, may be provided.

Figure 4:
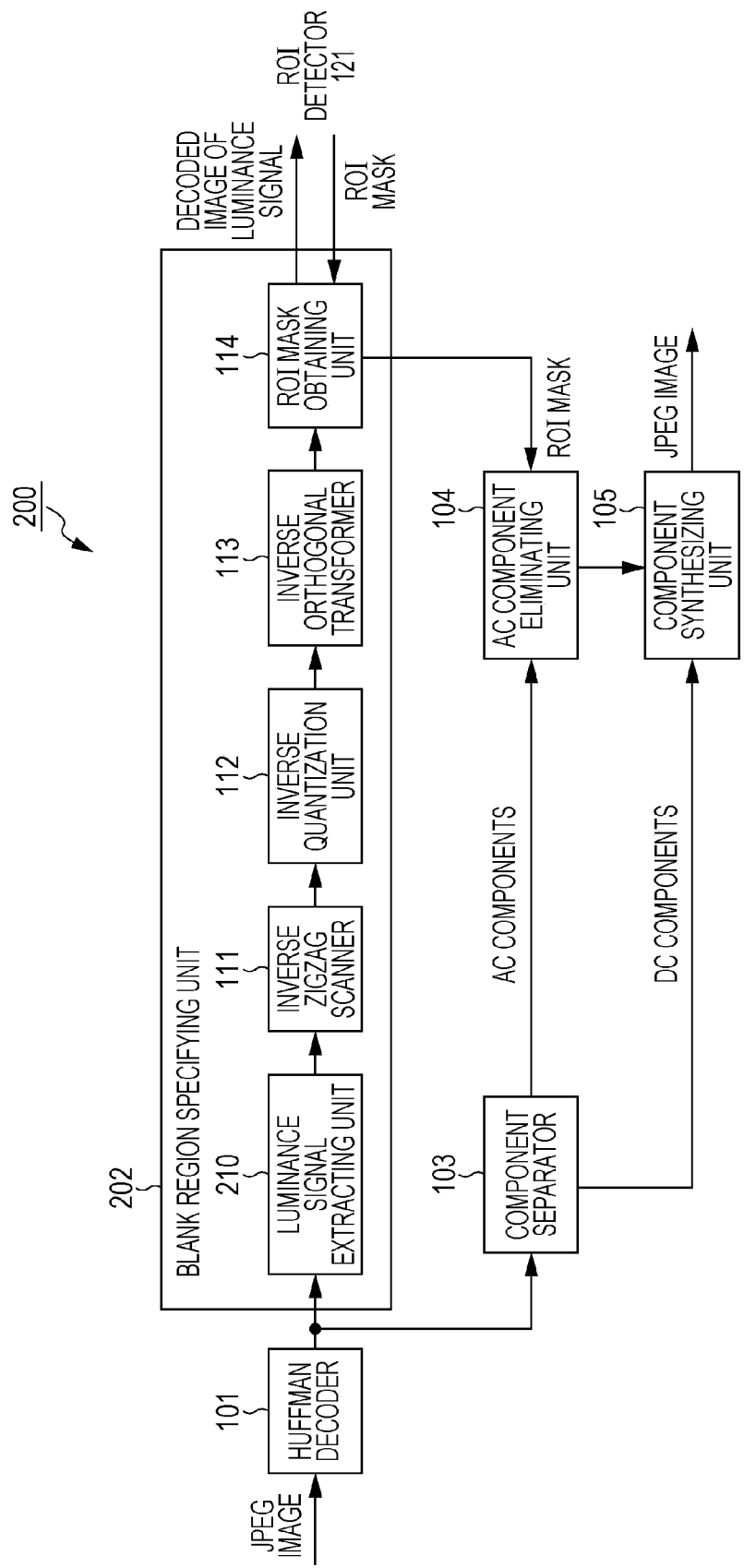
FIG. 4 is a block diagram illustrating an example of the major parts of the configuration of a transcoder according to a second embodiment of the present disclosure.

FIG. 4 is a block diagram illustrating an example of the major parts of the configuration of a transcoder 200 provided with such a blank region specifying unit according to a second embodiment of the present disclosure. The configuration of the transcoder 200 shown in FIG. 4 is basically similar to that of the transcoder 100 shown in FIG. 1, and the transcoder 200 performs transcoding similar to that of the transcoder 100.

That is, the transcoder 200, as well as the transcoder 100, specifies blank regions of a JPEG image and eliminates AC components of the blank regions, thereby reducing the data amount of the JPEG image.

The transcoder 200 includes a blank region specifying unit 202 instead of the blank region specifying unit 102. The blank region specifying unit 202 only decodes a luminance signal of a JPEG image, and supplies a decoded image of the decoded luminance signal to the ROI detector 121. The ROI detector 121 then generates an ROI mask on the basis of the decoded image of the luminance signal.

For example, if ROIs are specified by detecting edges or determining a distribution in the pixel values for each partial region, the ROI detector 121 sufficiently generates an ROI mask simply from the decoded image of the luminance signal.

The blank region specifying unit 202 includes a luminance signal extracting unit 210 in addition to the inverse zigzag scanner 111, the inverse quantization unit 112, the inverse orthogonal transformer 113, and the ROI mask obtaining unit 114. The luminance signal extracting unit 210 extracts luminance signal components from coefficient data of a JPEG image which has been subjected to Huffman decoding, and supplies the extracted luminance signal components to the inverse zigzag scanner 111.

The inverse zigzag scanner 111, the inverse quantization unit 112, and the inverse orthogonal transformer 113 generate a decoded image of the extracted luminance signal components, and the ROI mask obtaining unit 114 supplies the generated decoded image of the luminance signal components to the ROI detector 121. The ROI detector 121 then generates an ROI mask from the decoded image.

Flow of Conversion Processing

Figure 5:
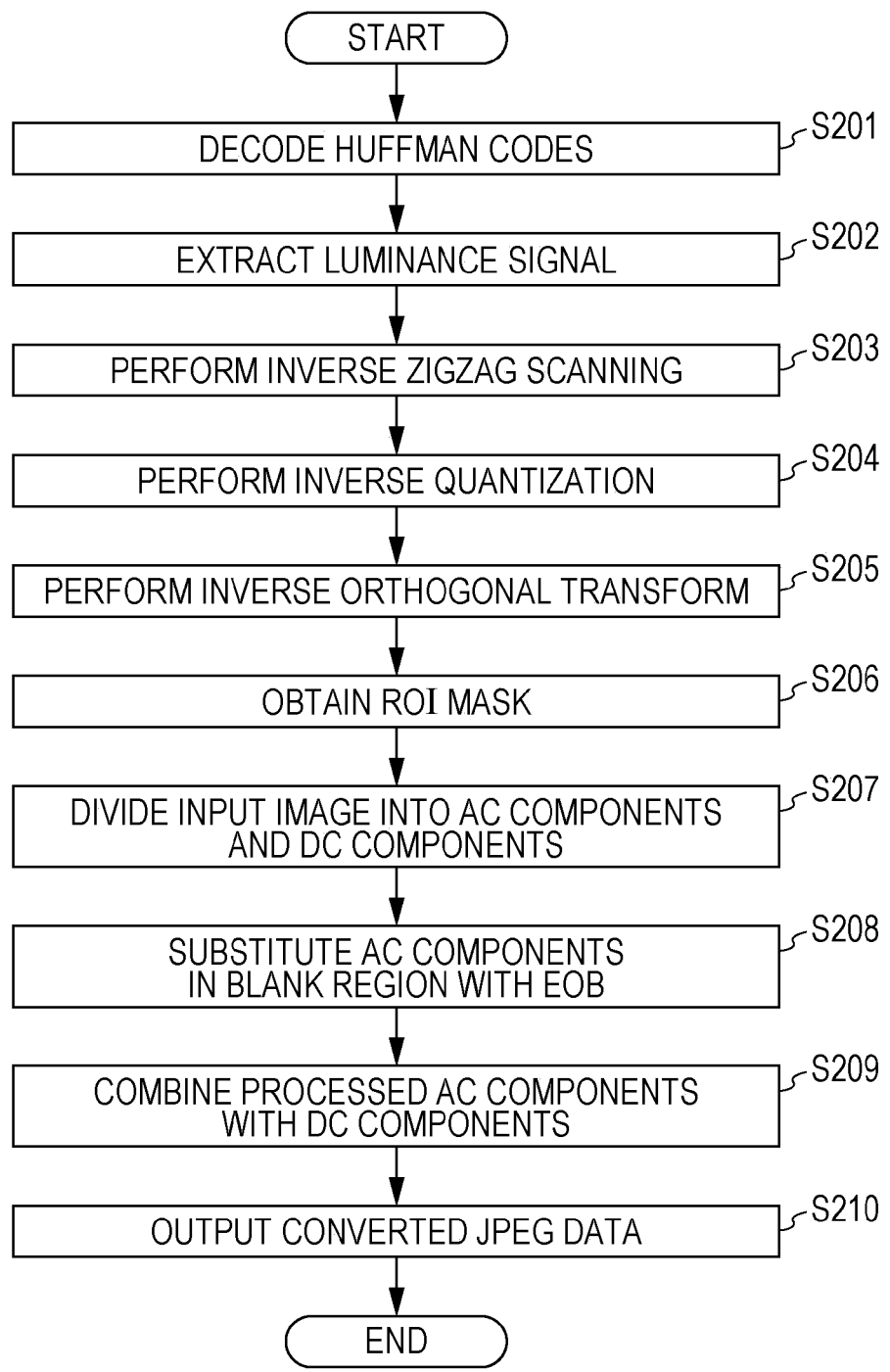
FIG. 5 is a flowchart illustrating data conversion processing according to the second embodiment of the present disclosure.

An example of the flow of conversion processing performed by the transcoder 200 is described below with reference to the flowchart of FIG. 5.

In step S201, the Huffman decoder 101 decodes Huffman codes of a JPEG image. Then, in step S202, the luminance signal extracting unit 210 extracts luminance signal components from the coefficient data.

Figure 3:
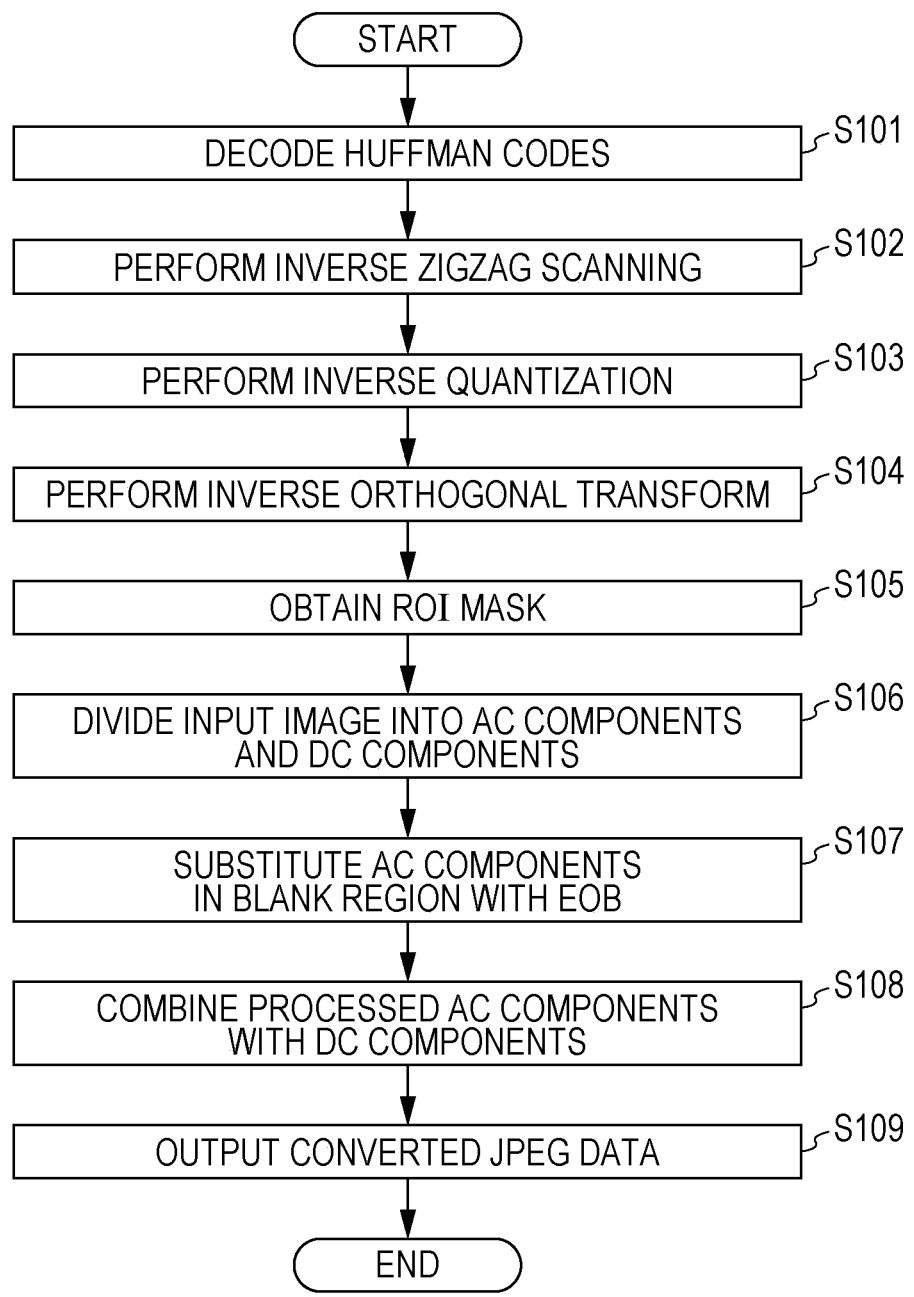
FIG. 3 is a flowchart illustrating data conversion processing according to the first embodiment of the present disclosure.

Steps S203 through S206 are executed in a manner similar to steps S102 through S105, respectively, of FIG. 3 by using the luminance signal components extracted in step S202.

Steps S207 through S210 are executed in a manner similar to steps S106 through S109, respectively, of FIG. 3.

As described above, in order to obtain an ROI mask, the transcoder 200 generates a decoded image only for a luminance signal of a JPEG image, and supplies the generated decoded image to the ROI detector 121. Thus, the transcoder 200 can obtain an ROI mask more easily.

That is, the transcoder 200 can reduce the amount of data more easily than the transcoder 100.

Instead of the luminance signal components, color difference components may be decoded and used for generating an ROI mask. Any type of information may be provided to the ROI detector 121 as long as the ROI detector 121 can generate an ROI mask on the basis of that information. For example, coefficient data obtained by performing Huffman decoding may be supplied to the ROI detector 121. In this case, the inverse zigzag scanner 111, the inverse quantization unit 112, and the inverse orthogonal transformer 113 may be omitted. Accordingly, the transcoder is able to reduce the amount of data more easily.

3. Third Embodiment

Transcoder

In the first and second embodiments, an ROI mask is generated in the external ROI detector 112. Alternatively, a transcoder may generate an ROI mask by itself.

Figure 6:
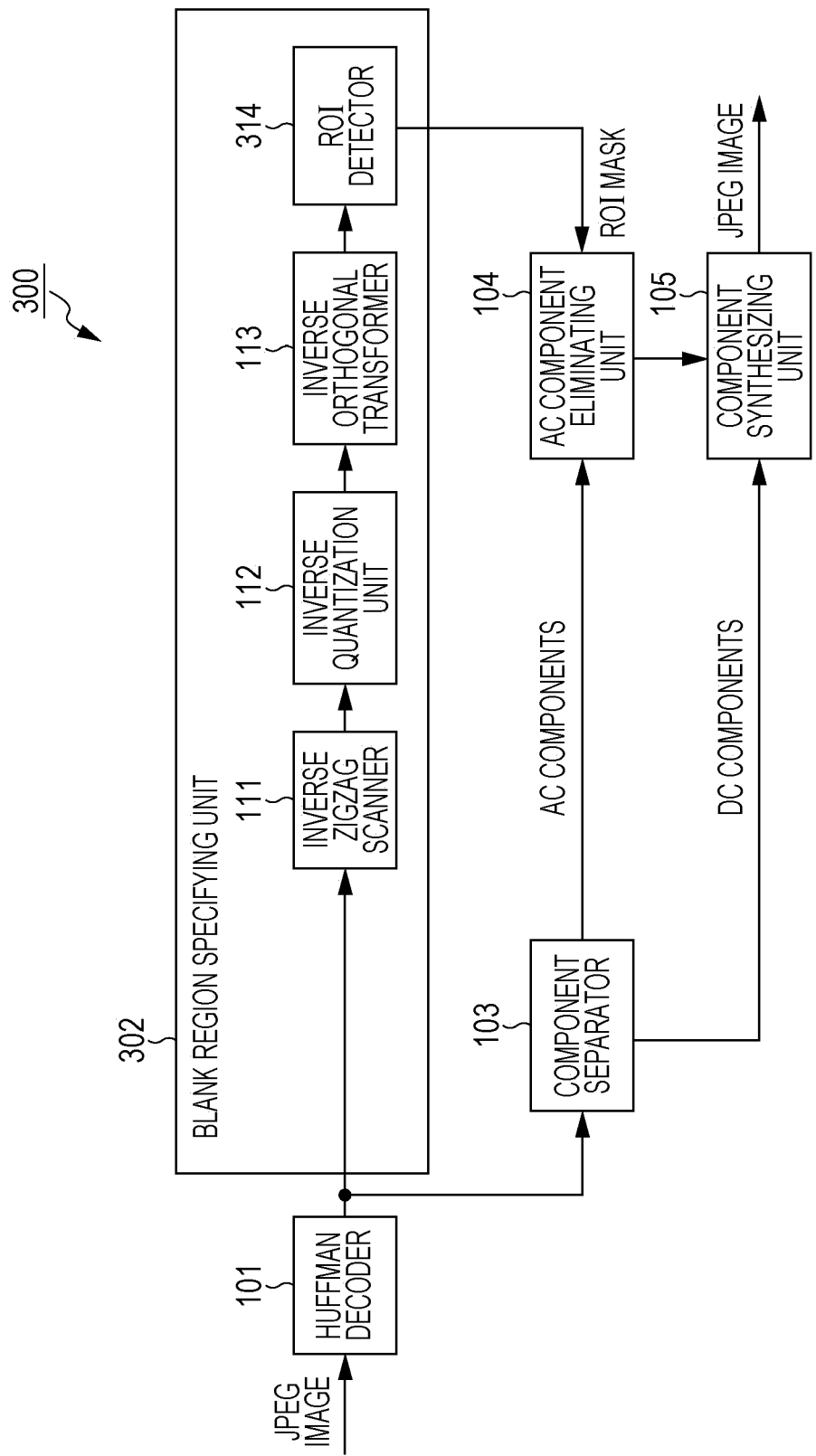
FIG. 6 is a block diagram illustrating an example of the major parts of the configuration of a transcoder according to a third embodiment of the present disclosure.

FIG. 6 is a block diagram illustrating an example of the major parts of the configuration of such a transcoder according to a third embodiment of the present disclosure. The configuration of a transcoder 300 shown in FIG. 6 is basically similar to that of the transcoder 100 shown in FIG. 1, and the transcoder 300 performs transcoding similar to that performed by the transcoder 100.

However, the transcoder 300 generates an ROI mask by itself. The transcoder 300 includes a blank region specifying unit 302 instead of the blank region specifying unit 102.

Basically, the blank region specifying unit 302 is configured similarly to the blank region specifying unit 102, but includes an ROI detector 314 instead of the ROI mask obtaining unit 114.

In a manner similar to the ROI detector 121, the ROI detector 314 analyzes the characteristics of a decoded image obtained by performing inverse orthogonal transform using the inverse orthogonal transformer 113 so as to generate an ROI mask that specifies ROIs (and blank regions).

ROIs (and blank regions) may be detected according to any desired method. For example, the ROI detector 314 may detect edge components from a decoded image and may specify regions containing the edge components as ROIs and other regions as blank regions.

Alternatively, the ROI detector 314 may determine a distribution in the pixel values for each partial region of a decoded image, and may specify regions having larger distribution values as ROIs and other regions as blank regions.

The ROI detector 314 supplies the generated ROI mask to the AC component eliminating unit 104.

Flow of Conversion processing

Figure 7:
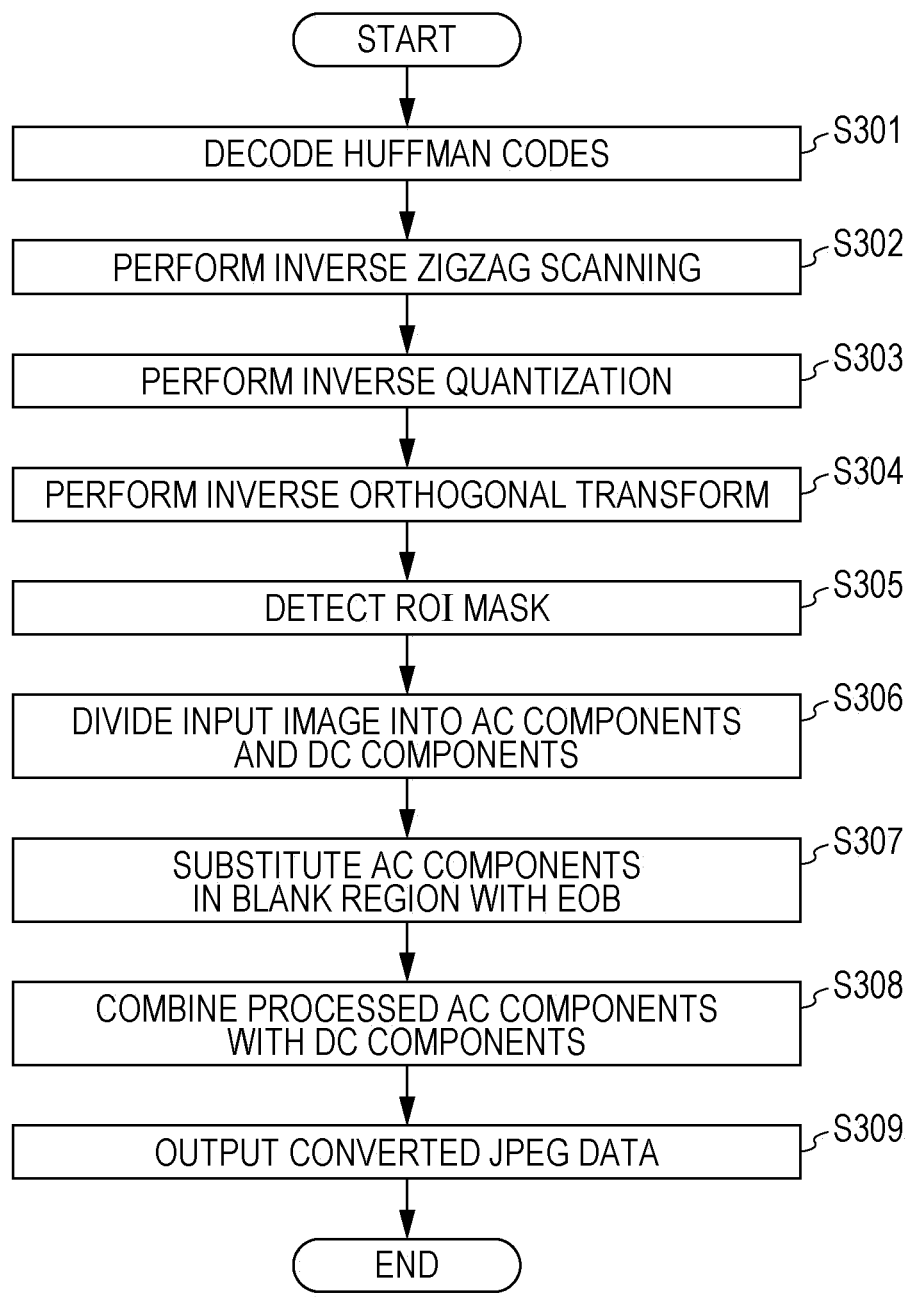
FIG. 7 is a flowchart illustrating data conversion processing according to the third embodiment of the present disclosure.

An example of the flow of conversion processing performed by the transcoder 300 is described below with reference to the flowchart of FIG. 7.

Steps S301 through S304 are similar to steps S101 through S104, respectively, of FIG. 3.

In step S305, the ROI detector 314 detects ROIs by using a decoded image generated in step S304 so as to generate an ROI mask.

Step S306 is similar to step S106 of FIG. 3.

In step S307, in the AC component codes separated from the DC component codes in step S306, the AC component eliminating unit 104 substitutes the regions (blocks), which are specified as the blank regions in the ROI mask generated in step S305, with the FOB, thereby eliminating AC components of the blank regions.

Steps S308 and S309 are similar to steps S108 and S109, respectively, of FIG. 3.

As described above, the transcoder 300 decodes an input JPEG image and generates an ROI mask by using the decoded JPEG image. This enable the transcoder 300 to specify blank regions without the need for the ROI detector 121.

That is, the transcoder 300 can reduce the amount of data easily by itself.

As in the second embodiment, the transcoder 300 which generates an ROI mask by itself may decode only part of image data, for example, only a luminance signal or only a color difference signal, so as to generate an ROI mask. Alternatively, the transcoder 300 may generate an ROI mask from coefficient data. Further, the inverse orthogonal transform processing may be simplified so as to reduce the load.

As in the above-described embodiments, an ROI mask having binary values, i.e., 0 and 1, is used for specifying blank regions. However, any type of information may be used for an ROI mask as long as the ROI mask has information concerning blank regions. For example, the ROI mask may be three-valued data or greater (0, 1, 2, . . . ).

Through the use of the above-described transcoding processing, the data amount of JPEG images can be reduced more easily. Accordingly, in the DPI system, after images of specimens are captured, they are initially compressed without detecting ROIs, and later, the JPEG images are subjected to transcoding. Accordingly, since it is not necessary to detect ROIs immediately after images of specimens are captured, the processing load can be reduced before performing noise elimination processing for blank portions. Thus, processing that is performed when specimens are imaged can be performed speedily, thereby enabling a user to check the images of specimens with low latency. Additionally, the above-described transcoding processing may be performed in the background, and processing for reducing the amount of data can be performed with a decreased load.

In the above-described embodiments, transcoding of JPEG images has been discussed. However, transcoding may be performed on images which are encoded by using any type of encoding method as long as AC components of a code stream can be eliminated. For example, data to be subjected to transcoding may be a code stream encoded by using an encoding method other than the Huffman encoding method.

Also, in the above-described embodiments, as an example of JPEG images, images obtained by imaging cells or tissues used in a biopsy or cytological diagnosis have been discussed. However, any type of image having characteristics similar to those of images used for medical examination tests, i.e., images including ROIs and blank regions, may be used. For example, map data, aerial photographs, satellite photographs, etc., may be used.

4. Fourth Embodiment
Personal Computer

The above-described series of processing operations may be executed by hardware or software. In this case, the above-described series of processing operations may be performed by a personal computer 400 shown in FIG. 8 according to a fourth embodiment of the present disclosure.

Figure 8:
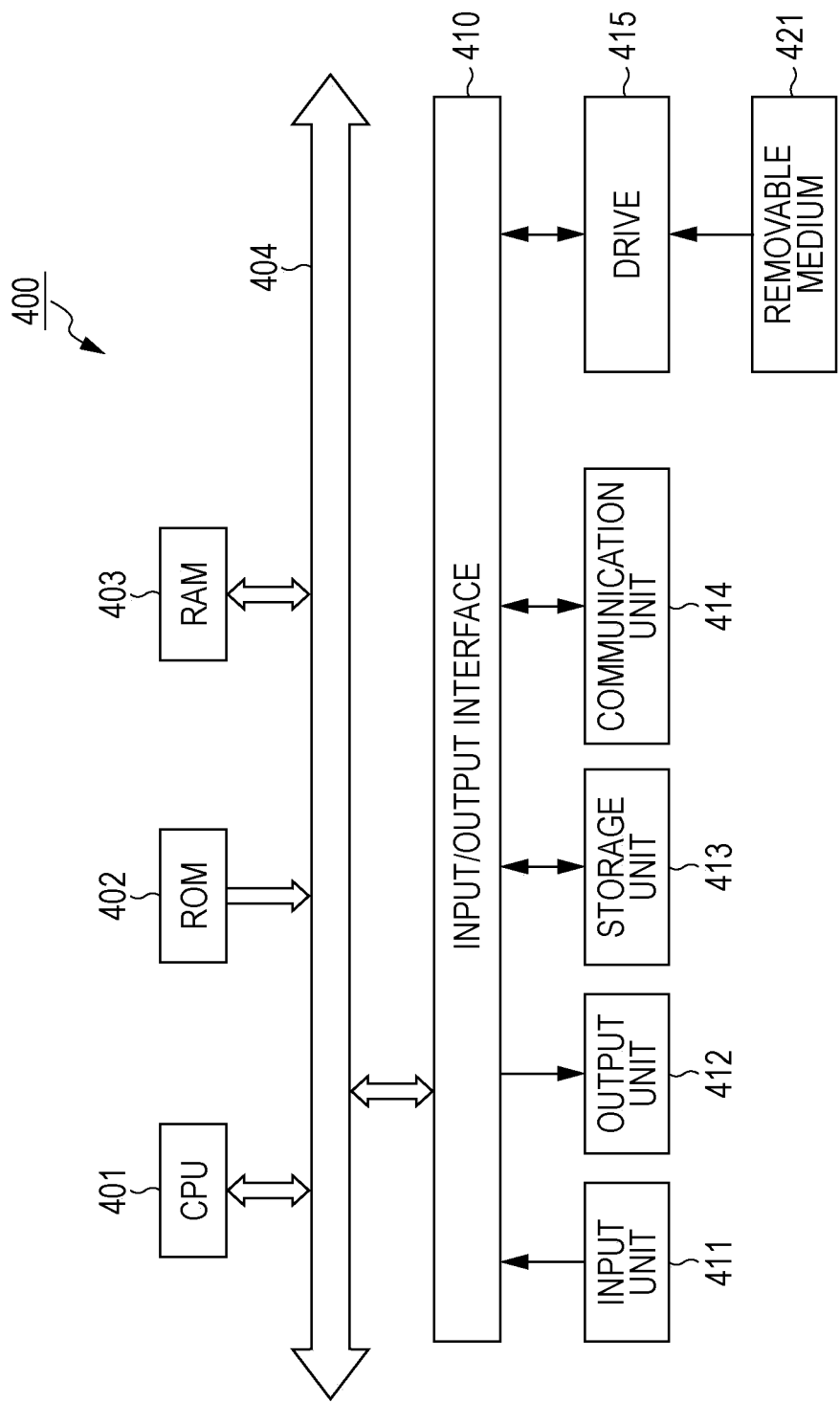
FIG. 8 is a block diagram illustrating an example of the major parts of the configuration of a personal computer according to a fourth embodiment of the present disclosure.

In FIG. 8, a central processing unit 401 of the personal computer 400 executes various types of processing in accordance with a program stored in a read only memory (ROM) 402 or a program loaded from a storage unit 413 to a random access memory (RAM) 403. In the RAM 403, data necessary for the CPU 401 to execute various types of processing are stored if necessary.

The CPU 401, the ROM 402, and the RAM 403 are connected to each other via a bus 404. An input/output interface 410 is also connected to the bus 404.

The input/output interface 410 is connected to an input unit 411 including a keyboard, a mouse, etc., an output unit 412 including a display, such as a cathode ray tube (CRT) or a liquid crystal display (LCD), and a speaker, the storage unit 413 including a hard disk, and a communication unit 414 including a modem. The communication unit 414 performs communication processing via a network including the Internet.

A drive 415 is connected to the input/output interface 410 if necessary. A removable medium 421, such as a magnetic disk, an optical disc, a magneto-optical disk, or a semiconductor memory, is set in the drive 415, and a computer program read out from the removable medium 421 is installed into the storage unit 413 if necessary.

If the above-described series of processing operations are executed by using software, a program forming that software is installed into the computer 400 via a network or a recording medium.

Such a recording medium may be a medium having a program recorded thereon and distributed to a user separately from the personal computer 400, such as the removable medium 421 shown in FIG. 8, including a magnetic disk (e.g., a flexible disk), an optical disk (e.g., a compact disc—read only memory (CD-ROM) or a digital versatile disc (DVD)), a magneto-optical disk (e.g., a mini disc (MD)), and a semiconductor memory on which a program is recorded. The recording medium may also be the ROM 402 or a hard disk contained in the storage unit 413, which has a program recorded thereon and which is distributed to a user in the state in which it is built in the personal computer 400.

The program executed by the computer 400 may be a program that is executed in chronological order, as in the order discussed in this specification, or may be a program that is executed in parallel or that is executed at a predetermined time, for example, when it is called.

In this specification, steps forming the program recorded on a recording medium include processing executed in chronological order, as in the order specified in this specification. The steps also include processing executed in parallel or individually.

In this specification, the apparatus is the entirety of the apparatus including a plurality of devices (or units).

Additionally, the configuration described as one unit (a device or a processor) may be divided into a plurality of units (devices or processors). Conversely, the configuration described as a plurality of units (devices or processors) may be integrated into one unit (a device or a processor). Also, configurations other than the above-described configurations may be added to the configuration of each unit (each device or each processor). Further, if the configuration or operation of the overall apparatus is substantially the same, part of the configuration of one unit (a device or a processor) may be included in the configuration of another unit (another device or another processor). That is, embodiments of the present disclosure are not restricted to the above-described embodiments, but various modifications may be made without departing from the spirit of the disclosure.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
 a specifying unit configured to specify a blank region of an image of image data by using coefficient data which is decoded from encoded data, the encoded data being obtained by encoding coefficient data generated from the image data;
 a dividing unit configured to divide the decoded coefficient data into first components and second components;

an eliminating unit configured to eliminate the blank region specified by the specifying unit from the first components divided from the decoded coefficient data by the dividing unit; and a synthesizing unit configured to combine the first components from which the blank region has been eliminated by the eliminating unit with the second components divided from the decoded coefficient data by the dividing unit.

2. The image processing apparatus according to claim 1, wherein the specifying unit includes a generator configured to generate a decoded data regarding the image from the coefficient data, and specifies a blank region of the decoded image generated by the generator.

3. The image processing apparatus according to claim 2, wherein:

the specifying unit further includes an obtaining unit configured to supply the decoded image generated by the generator to a different apparatus that generates a region-of-interest mask which includes information indicating a blank region of the decoded image, and configured to obtain the region-of-interest mask generated by the different apparatus; and the eliminating unit eliminates the blank region indicated in the region-of-interest mask obtained by the obtaining unit from the first components which are divided from the coefficient data by the dividing unit.

4. The image processing apparatus according to claim 3, wherein:

the specifying unit further includes an extracting unit configured to extract partial components from the coefficient data;

the generator generates a decoded image from the partial components extracted by the extracting unit;

the obtaining unit supplies the decoded image generated from the partial components by the generator to the different apparatus, and obtains a region-of-interest mask indicating a blank region of the decoded image generated by the generator; and the eliminating unit eliminates the blank region indicated in the region-of-interest mask obtained by the obtaining unit from the first components which are divided from the coefficient data by the dividing unit.

5. The image processing apparatus according to claim 2, wherein:

the specifying unit further includes a detector configured to detect the blank region from the decoded image generated by the generator; and the eliminating unit eliminates the blank region detected by the detector from the first components divided from the coefficient data by the dividing unit.

6. The image processing apparatus according to claim 1, wherein the encoded data is obtained by performing Huffman encoding on the coefficient data.

7. The image processing apparatus according to claim 1, wherein the image data is an image obtained by imaging cells or tissues of an organism.

8. The image processing apparatus according to claim 1, wherein the first components are alternating current components, and the second components are direct current components.

9. The image processing apparatus according to claim 1, wherein the synthesizing unit substitutes the first component corresponding to the blank region eliminated by the eliminating unit with an end of block, and combines the first components with the second components.

10. An image processing method for use in an image processing apparatus, comprising:

using at least one processor:

specifying a blank region of an image of image data by using coefficient data which is decoded from encoded data, the encoded data being obtained by encoding coefficient data generated from the image data;

dividing the decoded coefficient data into first components and second components;

eliminating the specified blank region from the first components; and combining the first components from which the blank region has been eliminated with the second components.

* * * * *